United States Patent Office 2,951,093
Patented Aug. 30, 1960

2,951,093
MANUFACTURE OF TRIALKYL BORANES

Robert Craig Anderson, Stevenston, Scotland, assignor to Imperial Chemical Industries Limited, London, England, a corporation of Great Britain No Drawing. Filed Aug. 4, 1958, Ser. No. 753,142

Claims priority, application Great Britain Aug. 30, 1957

4 Claims. (Cl. 260—606.5)

The present invention relates to a new and improved process for the preparation of normal alkyl boranes of the kind wherein the alkyl group contains from 1 to 3 carbon atoms.

The methods hitherto described for the preparation of trialkyl boranes have in general been technically inefficient or inconvenient or have necessitated the use of reagents which are relatively expensive or not readily available. These methods have included, for example, the reaction between boron trifluoride and dimethyl zinc; the reaction between trimethyl borate or the diethyl ether addition compound of boron trifluoride and Grignard reagents; the reaction between trimethyl borate and methyl aluminium sesquiiodide; the reaction between trialkyl borates and aluminium triethyl; the reaction between boron hydrides, or sodium borohydrides in the presence of aluminium chloride, and various olefines; and the reaction between boric oxide and aluminium trimethyl or methyl aluminium sesquiiodide.

According to the present invention a process for the production of normal trialkyl boranes of the kind wherein the alkyl groups contain from 1 to 3 carbon atoms comprises heating in an inert atmosphere a mixture containing boric oxide as such or in the form of an anhydrous metal borate and one or more normal alkyl aluminium halides wherein the alkyl groups contain from 1 to 3 carbon atoms and the halide is a chloride or bromide when the alkyl groups are methyl groups and a chloride when the alkyl groups are ethyl or n-propyl groups and condensing the vapour of the resulting trialkyl borane.

The alkyl aluminium halide is preferably a chloride. The bromides alone are ineffective when the alkyl groups are ethyl or n-propyl groups but they may be made effective by including in the reaction mixture metal chlorides capable of reacting with the alkyl aluminium bromide to give compounds having both alkyl groups and chlorine atoms attached to aluminium. Suitable chlorides include aluminium chloride, organoaluminium chlorides, alkali and alkaline earth metal chlorides.

The halide may be either a dialkyl aluminium monohalide or the monoalkyl aluminium dihalide, or it may be a mixture of these. It is, however, preferred to employ the materials known as alkyl aluminium sesquihalides which result from the reaction between aluminium and the corresponding alkyl halide.

According to one preferred modification of the invention, the alkyl aluminium halide is used in the form of a complex with an alkali or alkaline earth metal halide. This may be prepared prior to use or may conveniently be produced in presence of the boric oxide or metal borate by the reaction of an alkali metal halide and the appropriate monoalkyl aluminium dihalide. These alkali metal alkyl aluminium trihalides have the advantage that the reaction can be carried out at a higher temperature and hence at a higher rate than with the corresponding alkyl aluminium halide since they are solids which can be heated to temperatures substantially higher than the lowest temperature at which the corresponding alkyl aluminium halides will react with boric oxide or the metal borate to produce the corresponding trialkyl boranes, before they decompose to yield the appropriate alkyl aluminium halide and alkali metal halide.

According to another modification which is in some cases preferred, the alkyl aluminium halide may be formed in situ in the presence of the boric oxide or anhydrous metal borate, from the corresponding alkyl halide or alkyl halides and aluminium. In this case it is preferred that the boric oxide or metal borate and the aluminium should be dispersed by admixture with an inert diluent, for example, a finely divided solid inorganic material such as crystalline silica. This facilitates the passage of the vapours of the alkyl halide through the mixture of aluminium and boric oxide or metal borate at the elevated temperature required for reaction. In the absence of such a diluent the boric oxide or metal borate may begin to sinter and thereby offer resistance to the passage of the vapour. In the case where trimethyl borane is being prepared this embodiment is not preferred since it is not easy to separate the trimethyl borane from the excess methyl chloride. Thus it is preferred in this case to use preformed alkyl aluminium sesquichloride.

When boric oxide is employed, it is preferably finely powdered. When an anhydrous metal borate is to be used it is preferred to use the finely powdered product obtained by dehydrating borax by heating it, allowing it to cool and grinding.

The reaction leading to the formation of the trialkyl borane is normally carried out at atmospheric pressure. If desired, however, it may be carried out under reduced pressure. It is also unnecessary to use a solvent but a solvent may be used if desired. No advantages accrue, however, from the use of a solvent.

The tralkyl boranes and the alkyl aluminium halides are spontaneously inflammable and the latter also react violently with water. It is essential, therefore, that the reaction should be carried out in the absence of moisture and in an inert atmosphere, and also that the condensation of the trialkyl boranes should be carried out in an inert atmosphere, for example, one of nitrogen.

The reaction between the alkyl aluminium halides and the boric oxide or metal borate takes place satisfactorily at temperatures above 100° C., and it is preferred to operate at temperatures within the range 150 to 250° C. When using the alkyl aluminium halide itself it is frequently convenient to operate at the temperature at which the most volatile of the alkyl aluminium halides present boils, and when the alkyl aluminium halide is used as such it is convenient to carry out the reaction in a vessel fitted with means whereby any unreacted alkyl aluminium halide in the vapour phase may be condensed and returned to the reaction vessel. If necessary, a packed fractionation column may be employed to assist in separation of the desired product. As a rule, this is not necessary in the case where the alkyl aluminium halide is used in the form of its complex with an alkali or alkaline earth metal halide since the reaction may then be carried out at a temperature such that the complex is molten. In this case the reaction occurs so rapidly that substantially the only vapour encountered is that of the trialkyl borane.

In the case where the invention is carried out by introducing the vapour of methyl chloride into a mixture containing aluminium and boric oxide or a metal borate, which as already stated preferably includes an inert diluent, it is difficult to separate the vapours of the methyl chloride and the trimethyl borane even with the aid of a fractionation column. In this case an advantageous method of isolation consists in chilling the vapours containing the methyl chloride and the trimethyl borane to about —70° C. to condense them, adding an excess of triethylamine and distilling the resulting mixture at a temperature above 0° C., but substantially below the boiling point of triethylamine. Under these conditions the triethylmethylammonium chloride formed remains undecomposed but the equimolecular co-ordination compound of trimethyl borane and triethylamine also formed breaks up into its progenitors, and the trimethyl borane may be condensed by cooling the vapour to a temperature below —22° C. These operations are conducted in an inert atmosphere.

The invention is illustrated by the following examples, in which all parts and percentages are by weight except where otherwise indicated.

*Example 1*

A suspension of 7 parts of boric oxide in 41 parts of methyl aluminium sesquichloride was heated to boiling in a reactor provided with a calcium chloride moisture trap and having a short fractionating column and a distillation head leading to condensation trap cooled to —70° C. and which had been flushed out with nitrogen before introducing the methyl aluminium sesquichloride. The temperature at the zone of reflux rose gradually from 128° C. to 156° C. over the period of 5½ hours during which a condensate of trimethyl borane collected from the vapour passing over to the cooled trap. The trimethyl borane obtained was purified by converting it into its trimethylamine co-ordination compound and subliming the latter, the sublimate being subsequently decomposed by treatment with hydrochloric acid in a vessel from which the vapour is led to a trap cooled below —30° C. in presence of an inert atmosphere. The boiling point of the trimethyl borane was approximately —22° C. and a yield of about 32% of the theoretical was obtained after purification. Analysis of the sublimed co-ordination compound showed a carbon content of 61.8% and a hydrogen content of 15.1%, the calculated values being hydrogen 15.7% and carbon 62.7%.

*Example 2*

7 parts of boric oxide and 68 parts of methyl aluminium sesquibromide were heated together to boiling for 16 hours in a reactor of the kind described in Example 1, and which had previously been flushed with nitrogen. The product, which was collected in a manner similar to that of Example 1 in an atmosphere of nitrogen, was similarly purified by converting it into its trimethylamine co-ordination compound and recovering it therefrom. The yield of trimethyl borane was 37% of the theoretical.

*Example 3*

35 parts boric oxide and 248 parts of ethyl aluminium sesquichloride were refluxed together in a still equipped with a packed fractionating column and a still head leading to a water cooled condenser and receiver, the system having been flushed out with nitrogen before adding the ethyl aluminium sesquichloride. After heating for 8.5 hours at a temperature rising from about 190° to 230° it was found that there had collected a fraction boiling at 96 to 99° C. consisting almost entirely of triethyl borane in a yield amounting to 46% of the theoretical. The temperature at the distillation zone, which was originally 180° C., fell to 96° to 99° C. as the triethyl borane was formed and distilled over.

*Example 4*

The reactor used was the same as that described in Example 1. After it had been flushed with nitrogen, 273 parts of methyl aluminium dichloride and a mixture of 141 parts sodium chloride and 28 parts boric oxide were introduced thereinto. The temperature began to rise as a result of an exothermic reaction, and the reaction mixture was further heated until the contents of the vessel had a temperature of about 220 to 265° C. The trimethyl borane commenced to appear in the condensation trap shortly after the heating had been commenced. After about 40 minutes the reaction was completed, at one stage being so vigorous that the trap cooled to —70° C. was unable completely to condense the product. The product was isolated by addition of an excess of trimethylamine and the resulting product purified by sublimation. The amount of the sublimate corresponded to 60% of the theoretical yield based on the raw materials used.

*Example 5*

The reactor used was the same as in Example 3 and was first flushed out with nitrogen. 381 parts ethyl aluminium dichloride and a mixture of 176 parts sodium chloride and 35 parts boric oxide were introduced into the still. An exothermic reaction took place and after further heating for 2.5 hours there had collected 51 parts of a fraction distilling at 92 to 98° C. which consisted substantially of triethyl borane.

*Example 6*

The reactor used was the same as in Example 1 and was flushed out with nitrogen before use. 340 parts methyl aluminium dichloride and a mixture of 176 parts sodium chloride and 53.2 parts of anhydrous sodium pyroborate prepared by fusion of borax in an open vessel at a rising temperature, and subsequent chilling and powdering were introduced into the reaction. After external heating had been continued for 5 hours there had collected 23 parts of a volatile colourless trimethyl borane corresponding to a yield of 41% of the theoretical.

*Example 7*

The reactor used was the same as that used in Example 3 and was flushed out with nitrogen before use. 500 parts n-propyl aluminium dichloride and a mixture of 210 parts sodium chloride and 41 parts boric oxide were introduced into the reactor. An exothermic reaction took place and the still was further heated. The reaction appeared to be complete within about 10 minutes from its commencement. The condensate collecting during this period at a still head temperature of 150 to 160° C. amounted to 88 parts, corresponding to 53% of the theoretical yield. This product consisted of almost pure tri-n-propyl borane. As in the case of trimethyl borane and triethyl borane this product burned spontaneously in air with a green flame, but did not catch fire quite so quickly. Analysis showed a carbon content of 76.5% and a hydrogen content of 15.6%, the calculated values being carbon 77.3% and hydrogen 15.0%.

*Example 8*

The reactor consisted essentially of a stirred reaction vessel fitted with a vapour inlet leading to the bottom of the vessel and a vapour outlet limb at its upper part leading to an air cooled condensing chamber intended to condense the vapours of aluminium chloride generated in the reaction vessel when heat is applied to the latter externally by means of a heating bath, this air condenser being provided with a side arm leading to a cooling trap intended to receive and condense the vapours of methyl chloride and trimethyl borane. The vessel was first charged with a mixture of 70 parts boric oxide, 90 parts of ground aluminium scrap (of aluminium content 91%) and 100 parts finely divided quartz such as to pass a 200 mesh British Standard screen. The vessel was then heated to 270° C. Dry nitrogen was passed through the reaction vessel for half an hour at the rate of 6.3 parts per hour, after which the introduction of methyl chloride vapour was commenced at the same rate. When the introduction of the methyl chloride vapour commenced there was introduced one half part anhydrous aluminium chloride, which served as a catalyst. A sublimate of aluminium chloride began to appear in the air condenser in quantity about 15 minutes after the introduction of the catalytic quantity of aluminium chloride. The rate of passage of the methyl chloride vapour through the reaction mixture, which was kept continuously stirred, was now increased from 14 parts per hour to 42 parts per hour, and was continued for 10 hours. The product which collected in the receiver cooled to −70° C. was a solution of trimethyl borane in methyl chloride. Purified trimethyl borane was isolated from this by treatment with triethylamine and distillation from the mixture and condensation of the trimethyl borane vapour at a temperature of −70° C.

*Example 9*

The reactor used was the same as in Example 3. After it had been flushed out with nitrogen, 34.4 parts ethyl aluminium sesquibromide, 12 parts anhydrous aluminium trichloride and 3.14 parts of boric oxide were introduced. The mixture was thereafter heated at 240 to 260° C. for 1½ to 2 hours after which time there had collected 5.32 parts of volatile colourless liquid which on further distillation gave 3.8 parts of triethyl borane B.P. 90 to 92° C. corresponding to a 43% yield of the theoretical.

*Example 10*

The reactor used was the same as in Example 3. After flushing out with nitrogen, 325.8 parts of ethyl aluminium sesquibromide and 114 parts of anhydrous aluminium chloride were introduced and mixed together for 5 minutes to allow solution and interaction. 29.8 parts of boric oxide were then added and the mixture allowed to stand overnight. The mixture was thereafter heated to about 230 to 230° C. for 1½ hours after which time there had collected 47.5 parts of triethylborane B.P. 93 to 97° C. corresponding to a 56% yield.

*Example 11*

The reactor used was the same as in Example 3 and was flushed out with nitrogen before use. 38 parts of ethyl aluminium sesquibromide were introduced into the still followed by a mixture of 15.6 parts anhydrous aluminium bromide, 17.6 parts sodium chloride, and 3.5 parts of boric oxide. An exothermic reaction took place and after further heating for 1½ hours there had collected 3.75 parts of a fraction distilling at 90 to 94° C. which consisted essentially of triethyl borane.

Analysis of the product gave: C 71. 0; H 16.71; B 10.95 (Theoretical: C 73.5; H 15.4; B 11.04).

What I claim is:

1. A process for the production of trialkyl boranes comprising heating in an inert atmosphere and to a temperature exceeding 220° C., a mixture consisting essentially of a boron compound selected from the group consisting of boric oxide and anhydrous alkali metal borate, and an organo-aluminum complex compound prepared by reacting an alkali metal halide having the general formula MX with a monoalkyl aluminum dihalide having the general formula $RAlY_2$, wherein M is an alkali metal, R is an alkyl group containing 1 to 3 carbon atoms, and X and Y are halogens selected from the group consisting of chlorine and bromine, with the proviso that when R is an alkyl group containing 2 to 3 carbon atoms at least one of X and Y is chlorine, and condensing the vapor of the resulting trialkyl borane.

2. A process according to claim 1 wherein the anhydrous metal borate is finely divided sintered borax.

3. A process according to claim 1 wherein the reaction is carried out at atmospheric pressure.

4. A process for the production of trialkyl boranes comprising heating in an inert atmosphere and to a temperature exceeding 220° C., a mixture consisting essentially of a boron compound selected from the group consisting of boric oxide and anhydrous alkali metal borate, an organo-aluminum complex compound prepared by reacting an alkali metal bromide having the general formula MBr with a monoalkyl aluminum dibromide having the general formula $RAlBr_2$, wherein M is an alkali metal, and R is an alkyl group containing 1 to 3 carbon atoms, and an alkali metal chloride, and condensing the vapor of the resulting trialkyl borane.

References Cited in the file of this patent

UNITED STATES PATENTS

| | | |
|---|---|---|
| 2,266,776 | Leum | Dec. 23, 1941 |
| 2,853,527 | Perrine | Sept. 23, 1958 |

OTHER REFERENCES

Brown et al.: J. Am. Chem. Soc., vol. 69, pages 1332–6 (1947). Copy in Scientific Library.